March 1, 1960 L. G. STYRON 2,926,402
WINDOW GUARD
Filed Feb. 6, 1958 4 Sheets-Sheet 1
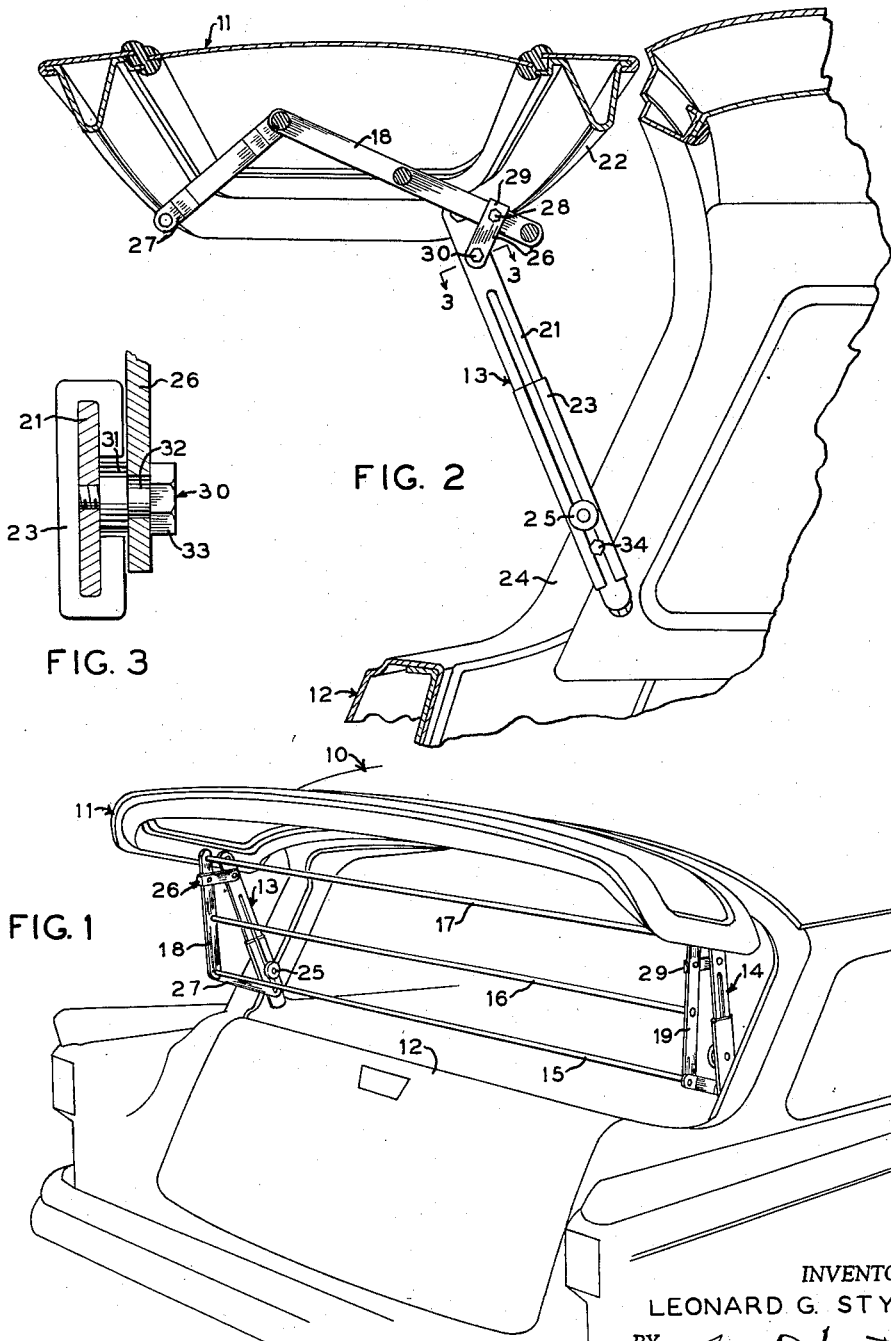
INVENTOR.
LEONARD G. STYRON
BY
ATTORNEY March 1, 1960

L. G. STYRON 2,926,402

WINDOW GUARD

Filed Feb. 6, 1958

INVENTOR.
LEONARD G. STYRON

BY

ATTORNEY

March 1, 1960 L. G. STYRON 2,926,402
WINDOW GUARD
Filed Feb. 6, 1958 4 Sheets-Sheet 3

INVENTOR.
LEONARD G. STYRON
BY
ATTORNEY

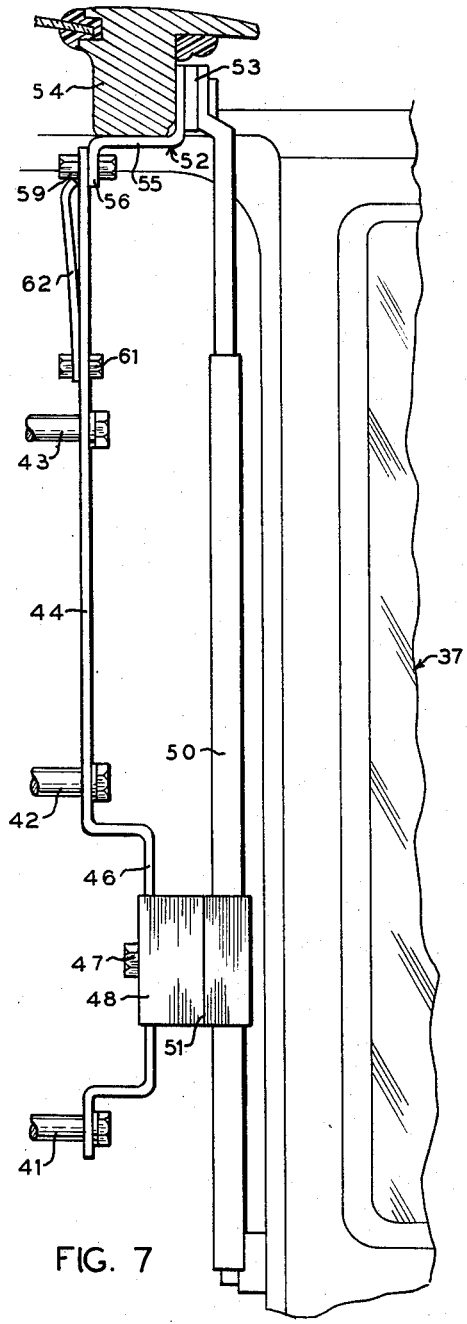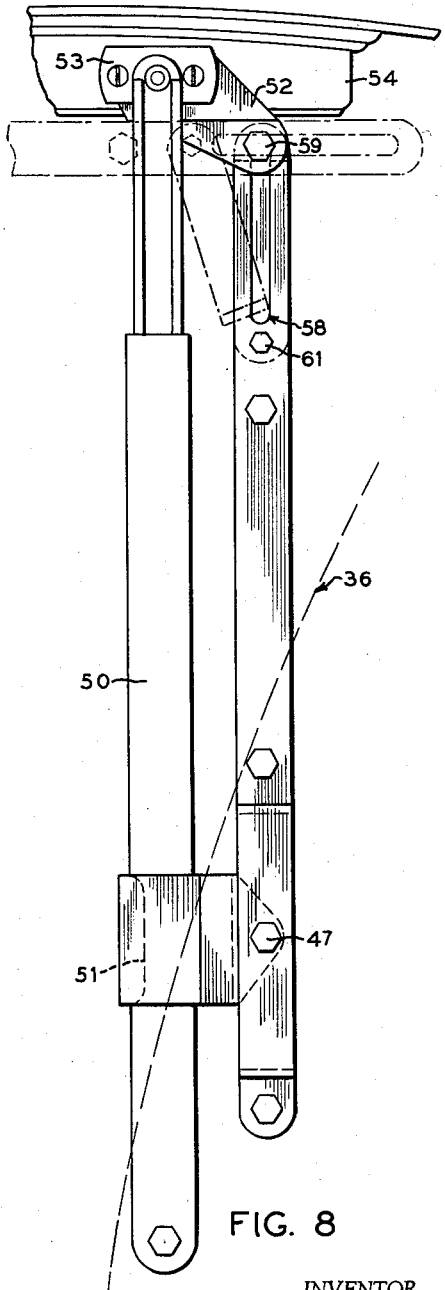
FIG. 7
FIG. 8

United States Patent Office 2,926,402
Patented Mar. 1, 1960

2,926,402
WINDOW GUARD
Leonard G. Styron, Atlanta, Ga.
Application February 6, 1958, Serial No. 713,703
11 Claims. (Cl. 20—71)

This invention relates to a window guard, and more particularly concerns a guard for a window having a pivotable closure member such as the tailgate window of a station wagon. The conventional tailgate arrangement of such vehicles is generally characterized by an upper window section and a lower door section, both adapted to open outwardly along a horizontal interface, hingedly pivoting from their upper and lower edges, respectively. In the operation of such vehicles it is often desirable, particularly in warm weather, to leave the window section of the tailgate raised so that the reduced pressure area therebehind when moving may be utilized to facilitate ventilation of the passenger portion of the vehicle; however, such disposition of the upper tailgate is often inconsistent with common usage of the station wagon. For example, when small children or pets are being carried, the danger exists that such passengers may inadvertently fall over the door section of the tailgate.

It is highly desirable, therefore, to provide a protective guard across the tailgate window opening that will alleviate the above mentioned danger without interfering with its beneficial effect. It is further important that such protective barrier be adaptable so as to permit utilization of the entire tailgate opening for loading and unloading of the station wagon.

Accordingly, the present invention provides a grating pivotally securable across the tailgate window opening, the arrangement being such that the grating automatically swings into guard position across the opening when the tailgate window is raised, and collapses into the interior of the station wagon when the window is closed. As an additional feature, when the window is in open position the grating may be raised so as to permit loading and unloading of the station wagon.

It is one of the objects of my invention, therefore, to provide a new and improved guard for a window having a pivotable closure member, the arrangement being such that the guard is adapted to pivot into position automatically in response to movement of the closure member.

Another object of my invention is to provide a new and improved window guard for the tailgate of a station wagon which effectively guards the opening while permitting maximum use of the interior of the station wagon.

A further object of my invention is to provide a new and improved guard for the rear window of a station wagon which permits use of the entire tailgate opening for loading and unloading.

Still another object of my invention is to provide a new and improved window guard for a station wagon tailgate which is rugged and yet simple in construction and which lends itself readily to the demands of economic manufacture.

Numerous other objects, features and advantages of my invention will become apparent from consideration of the following description taken in conjunction with the accompanying drawings wherein like reference characters refer to the same or similar parts throughout the several views, and in which:

Fig. 1 is a perspective view of the rear portion of one station wagon type of motor vehicle showing an illustrative window guard in place with the tailgate window in an open position.

Fig. 2 is a perspective view, partly cut away, showing the window guard of my invention in raised position.

Fig. 3 is a fragmentary detail in cross section, taken along the line 3—3 in Fig. 2, showing the pivotal relationship of the guard with an extensible brace.

Fig. 7 is a fragmentary elevation view showing the coupling of the guard with the tailgate window frame and extensible brace therefor.

Fig. 8 is a fragmentary side elevational view of the tailgate window guard of my invention showing the raised position of the guard by broken lines.

Figure 5:
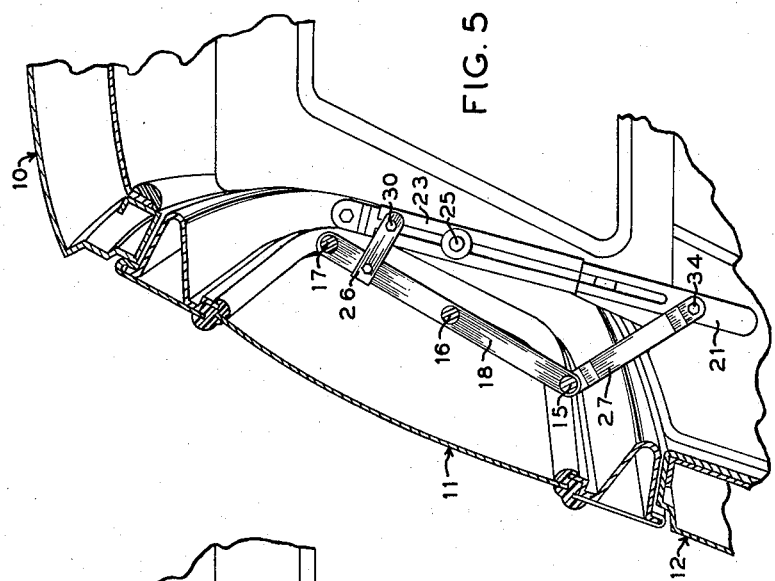
Fig. 5 is a perspective view, partly broken away, illustrating the tailgate window guard in its primary functional position.

Referring now more particularly to the drawings, Figs. 1 and 2 show the application of the present inventive concept to one type of conventional station wagon 10 as viewed from the rear. The tailgate arrangement is characterized by an upper window section 11 and a lower door section 12, both closure members being pivoted at the upper and lower edges thereof, respectively, for opening outwardly from along a horizontal interface. As previously noted, it is common practice for such vehicles to be operated with the window section 11 raised, as shown, and held so disposed by extensible braces 13 and 14. Cooperating with this conventional arrangement is a grating member adapted to extend across the tailgate window opening and characterized by spaced horizontal bars 15, 16 and 17 suitably secured, as by bolting, to head members 18 and 19.

Referring now particularly to one side of the tailgate, it being understood that the description hereinafter presented is equally applicable to both sides, it can be seen that inner member 21 of extensible brace 13 is pivotally mounted on tailgate window frame 22, and outer brace member 23 is mounted on jamb 24 in like manner, the arrangement being such that the brace members are adapted to be secured from relative movement by binding post 25. In accordance with the invention, the grating is secured to inner member 21 of the extensible brace 13 by arm 26 and leg 27 which are fixedly joined at the top and bottom, respectively, to head member 18. As shown here by way of illustration, the arm 26 is bolted to the upper portion of head member 18, as at 28, and is further secured thereto by the return-bent portion 29. The other end of the arm 26 is pivotally fastened to inner brace member 21. As shown by way of example in Fig. 3, this may be accomplished by the provision of shoulder bolt 30, threaded into inner space member 21 but spaced therefrom by collar or washer 31. It will be appreciated from this construction that the collar 31 offsets the shoulder 32 which is of such length that arm 26 is freely rotatable thereon between collar 31 and head 33. One end of leg 27 is suitably secured, as by bolting, to the lower portion of head member 18 forming an obtuse angle therewith; the other end thereof being removably bolted, at 34, to the inner brace member 21 in a manner similar to the bolting of the arm 26, as shown in Fig. 3. As will be hereinafter seen, however since the leg 27 is not adapted to pivot relative to brace 13, the shoulder 32 need not provide leg 27 with clearance between collar 31 and head 33.

To permit utilization of the entire tailgate opening for loading and unloading of the station wagon, provision is made for raising the window guard in a manner similar to the raising of the tailgate window. It is first necessary, however, to remove lower shoulder bolts 34, after which the grating may be swung outwardly as by grasping lower horizontal bar 15, the arrangement being such that the guard will pivot on upper shoulder bolts 30. It will be noted that the guard is adapted to be retained in such raised position by the head members, the upper portions of which are adapted to spring under the tailgate window frame as shown in Fig. 2.

Figure 4:
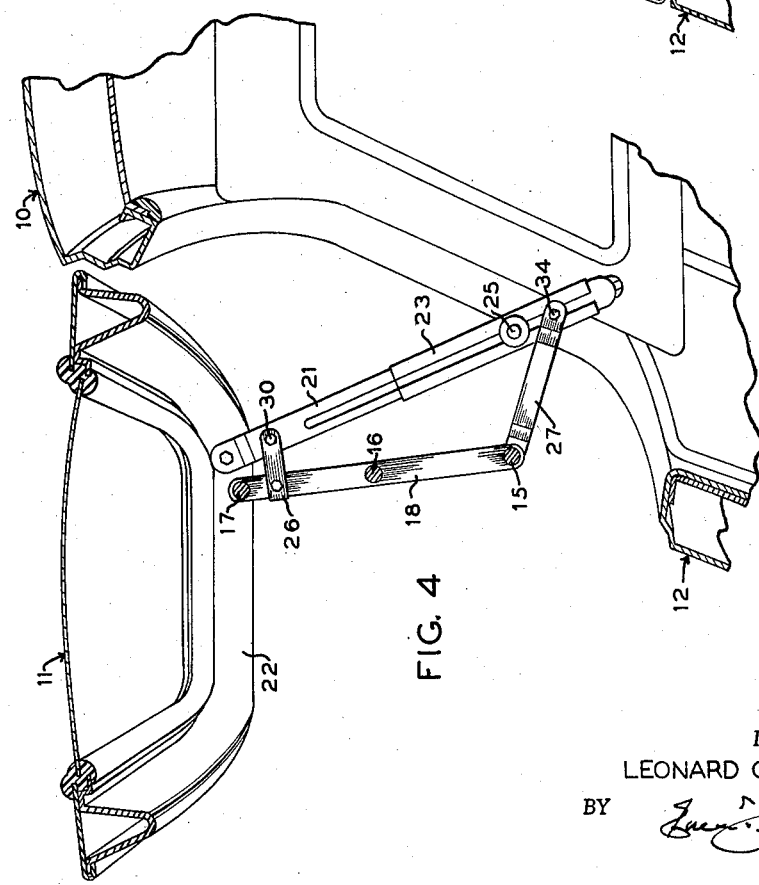
Fig. 4 is a perspective view, partly cut away, showing the position of the guard with the tailgate window closed.

Fig. 4 illustrates the tailgate window in raised position, with the grating member projecting out from the opening so as to maximize the usable area in the rear of the station wagon. As the window is being raised, outer brace member 23 is adapted to slidably pass collar 31 between shoulder 32 of bolt 30 and inner brace member 21. In like manner, when the tailgate window is lowered, the outer brace member slidably passes the shoulder bolt mounting on leg 27, with the grating member swinging downwardly into the interior of the station wagon to a position just inside the window, as illustrated in Fig. 5. It will be recognized that in the foregoing arrangement the grating and inner brace member remain stationary relative to each other. It can further be seen that the plane of the grating member remains substantially constant relative to the plane of the braces throughout their slidable range.

Figure 6:
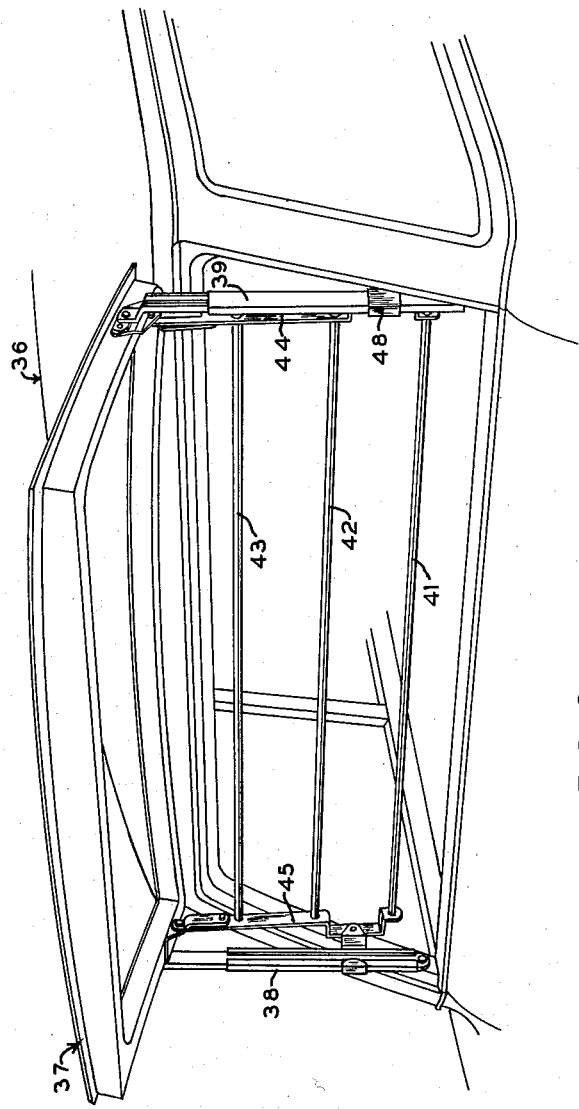
Fig. 6 is a perspective view of a window guard according to my invention as applied to another type of conventional station wagon.

Fig. 6 shows an application of the present invention to another type of conventional station wagon 36 having tailgate window section 37 supported in raised position by extensible braces 38 and 39. Extending across the window opening is a grating, according to the present invention, characterized by elongate bars 41, 42 and 43 which are suitably secured, as by bolting, to head members 44 and 45.

Referring now particularly to one side of the tail-gate as in Figs. 7 and 8, it can be seen that head member 44 is formed with a laterally offset portion 46 above the lower grating bar 41. Releasably secured by removable bolt 47 to offset portion 46 is guide sleeve 48 formed fully around outer brace member 50 on three sides thereof and with lip 51 on the fourth side, the arrangement being such that the guide sleeve 48 is adapted for slidable engagement with the outer brace member 50 when the tailgate window is raised or lowered.

The head member 44 extends upwardly for pivotal securement to window frame bracket 52. As shown, bracket 52 is fastened under conventional extensible brace mount 53 at the outside of window frame 54 and has an underbent portion 55 terminating in a downwardly depending ear 56 having an aperture therethrough. The upper end of head member 44 is formed with a central elongate slot 58 through the upper end of which shoulder bolt 59 is adapted to pass to pivotally mount head member 44 to depending ear 56, the arrangement being such that the shoulder portion of bolt 59 is adapted to ride in elongate slot 58 of head member 44. Pivotally secured to head member 44 by double ended bolt 61, just below the termination of the elongate slot 58, is spring-steel keeper 62 which is adapted to abut the head of shoulder 59 so as to secure the position of head member 44 with respect to supporting shoulder bolt 59 and ear 56.

From the foregoing it can be seen that upon removal of bolt 47 securing head member 44 to guide sleeve 48, the grating may be pivoted outwardly on shoulder bolt 59. Such action, combined with release of keeper 62 from the head of shoulder bolt 59, permits the entire guard assembly to be moved inwardly, the arrangement being such that the shank of shoulder bolt 59 rides in head member slot 58, as shown by the broken lines in Fig. 8. Upon release of the grating in such position it can be seen that the portion of head member 44 adjacent the slot 58 will abut tailgate window frame 54 so as to latch the grating in raised position. It will be appreciated that such disposition of the window guard permits utilization of the entire tailgate opening for loading and unloading of the station wagon through the tailgate, thereby allowing maximum use of the interior of the station wagon.

To return the guard to its primary functional position it is only necessary to pull the grating rearwardly until the head members clear the tailgate window frame. The grating may then be swung down, whereupon the offset portion of each head member may then be rebolted to its respective guide sleeve to complete the operation. Secured in such position, it can be seen that the grating member is in a plane which remains substantially constant relative to the plane of the braces, throughout the raising and lowering of the tailgate window. It will be apparent that I have provided a window guard which is well adapted to fulfill the aforestated objects of my invention. Moreover, whereas the invention has been disclosed in particularity with respect to embodiments which give satisfactory results, it will be understood by those skilled in the art to which the invention most nearly appertains, that additional embodiments and modifications thereof may be provided without departing from the spirit or scope of my invention as defined in the appended claims.

I claim:

1. A guard for use in a window having a pivotable closure member with a pair of slidable coplanar braces secured thereto including: a grating member adapted to extend across said window, and means associated with said braces for releasably maintaining said grating member in a plane of substantially constant angularity relative to the plane of said braces throughout the slidable range thereof said means including first securing means pivotally associating said grating member with said braces, and second securing means releasably associating said grating member with said braces.

2. A guard for use with a window as set forth in claim 1 wherein said first securing means includes a pair of depending brackets each secured with one of said braces to said closure member, pivot means in each of said brackets, said grating member having a pair of head members each formed with an elongate slot therein, each of said pivot means adapted for slidable movement in one of said slots, and means for releasably maintaining said pivot means in predetermined relation in said slots.

3. A guard for use in a window as set forth in claim 1 wherein said first securing means includes a pair of pivot members each secured to one said braces, said grating member having a pair of head members, and a pair of arms each fixedly joined to one of said head members and pivotally mounted on one of said pivot members.

4. A guard for use in a window as set forth in claim 1 wherein said second securing means includes a pair of guide sleeves each adapted for slidable engagement with one of said braces, said grating member having a pair of head members, each of said guide sleeves adapted for releasable securement with one of said head members.

5. A guard for use in a window as set forth in claim 1 wherein said second securing means includes a pair of pin members each secured to one of said braces, said grating member having a pair of head members, and a pair of leg members, each fixedly secured to one of said head members and releasably secured to one of said pin members.

6. A guard for use in a window having a pivotable closure member with a pair of extensible braces secured thereto including: a positionable grating, and means associated with said braces for controlling the position of said grating in response to pivotal movement of said closure member; said means including first securing means pivotally associating said grating member with said braces, and second securing means releasably associating said grating member with said braces.

7. A guard for use in a window having a pivotable closure member with a pair of extensible braces secured thereto comprising: a positionable grating, and means associated with said braces for controlling the position of said grating in response to pivotal movement of said closure member; said means having first securing means pivotally associating said grating member with said braces including a pair of depending brackets each secured with one of said braces to said closure member, pivot means in each of said brackets, said grating member having a pair of head members each formed with an elongate slot therein, each of said pivot means adapted for slidable movement in one of said slots, and means for releasably maintaining each of said pivot means in predetermined position in said slots.

8. A guard for use in a window having a pivotable closure member with a pair of extensible braces secured thereto comprising: a positionable grating, and means associated with said braces for controlling the position of said grating in response to pivotal movement of said closure member; said means having first securing means pivotally associating said grating member with said braces including a pair of depending brackets each secured with one of said braces to said closure member, pivot means in each of said brackets, said grating member having a pair of head members each formed with an elongate slot therein, each of said pivot means adapted for slidable movement in one of said slots, and means for releasably maintaining each of said pivot means in predetermined position in said slots including a pair of pivotally secured resilient keeper members each adapted to abut one of said pins.

9. A guard for use in a window having a pivotable closure member with a pair of extensible braces secured thereto comprising: a positionable grating, and means associated with said braces for controlling the position of said grating in response to pivotal movement of said closure member; said means including first securing means pivotally associating said grating member with said braces, and second securing means releasably associating said grating member with said braces, said first securing means including a pair of pivot members each secured to one said braces, said grating member having a pair of head members, and a pair of arms each fixedly joined to one of said head members and pivotally mounted on one of said pivot members.

10. A guard for use in a window having a pivotable closure member with a pair of extensible braces secured thereto comprising; a positionable grating, and means associated with said braces for controlling the position of said grating in response to pivotal movement of said closure member; said means including first securing means pivotally associating said grating member with said braces, and second securing means releasably associating said grating member with said braces; said second securing means including a pair of guide sleeves each adapted for slidable attachment with one of said braces, said grating member having a pair of head members, each of said guide sleeves adapted for releasable securement with one of said head members.

11. A guard for use in a window having a pivotable closure member with a pair of extensible braces secured thereto comprising: a positionable grating, and means associated with said braces for controlling the position of said grating in response to pivotal movement of said closure member; said means including first securing means pivotally associating said grating member with said braces, and second securing means releasably associating said grating member with said braces, said second securing means including a pair of pin members each secured to one of said braces, said grating member having a pair of head members, and a pair of leg members each fixedly secured to one of said head members and releasably secured to one of said pin members.

References Cited in the file of this patent

UNITED STATES PATENTS

| | | |
|---|---|---|
| 373,970 | Di Gaetano | Nov. 29, 1887 |
| 1,629,541 | Scholer | May 24, 1927 |
| 2,799,530 | Drake | July 16, 1957 |